(12) United States Patent
Li (10) Patent No.: US 11,250,734 B2
(45) Date of Patent: Feb. 15, 2022

(54) FOLDABLE DISPLAY APPARATUS, ELECTRONIC APPARATUS, METHOD OF OPERATING FOLDABLE DISPLAY APPARATUS, AND METHOD OF FABRICATING FOLDABLE DISPLAY APPARATUS

(71) Applicant: BOE Technology Group Co., Ltd., Beijing (CN)

(72) Inventor: Zhao Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 514 days.

(21) Appl. No.: 16/336,613

(22) PCT Filed: Sep. 28, 2018

(86) PCT No.: PCT/CN2018/108317
§ 371 (c)(1),
(2) Date: Mar. 26, 2019

(87) PCT Pub. No.: WO2019/062849
PCT Pub. Date: Apr. 4, 2019

(65) Prior Publication Data
US 2021/0366316 A1     Nov. 25, 2021

(30) Foreign Application Priority Data
Sep. 28, 2017   (CN) .......................... 201710899875.3

(51) Int. Cl.
*G09F 9/30* (2006.01)
*G06F 1/16* (2006.01)
(52) U.S. Cl.
CPC ............ *G09F 9/301* (2013.01); *G06F 1/1616* (2013.01); *G06F 1/1652* (2013.01)

(58) Field of Classification Search
CPC combination set(s) only.
See application file for complete search history.

(56) References Cited

U.S. PATENT DOCUMENTS 4,923,057 A * 5/1990 Carlson ..................... E04B 1/98
188/267.1
5,257,681 A * 11/1993 Shtarkman .............. F16F 9/535
188/130

(Continued)

FOREIGN PATENT DOCUMENTS

CN      102419933 A    4/2012
CN      104423433 A    3/2015

(Continued)

OTHER PUBLICATIONS

International Search Report & Written Opinion dated Jan. 7, 2019, regarding PCT/CN2018/108317.

(Continued)

*Primary Examiner* — Lisa Lea-Edmonds
(74) *Attorney, Agent, or Firm* — Intellectual Valley Law, P.C.

(57) ABSTRACT

A foldable display apparatus includes a display area for image display. The foldable display apparatus includes a foldable display panel including a bendable portion in the display area; a first chamber and a second chamber in the display area and connected with each other, an orthographic projection of the first chamber on the foldable display panel at least partially covers the bondable portion; and a variable stiffness material in at least the first chamber thereby providing support for the bendable portion of the foldable display panel in an unfolded configuration, and being at least partially transferred to the second chamber thereby reducing stress in the bondable portion in the foldable display panel in a folded configuration.

17 Claims, 4 Drawing Sheets

(56) References Cited

U.S. PATENT DOCUMENTS

| | | | |
|---|---|---|---|
| 9,405,368 B2* | 8/2016 | Modarres | G06F 1/163 |
| 9,971,409 B2* | 5/2018 | Modarres | G06F 1/1652 |
| 10,257,929 B2* | 4/2019 | Lim | G06F 3/0445 |
| 10,503,262 B2* | 12/2019 | Modarres | G06F 1/1643 |
| 10,571,961 B2* | 2/2020 | Lee | G06F 1/1616 |
| 11,116,094 B2* | 9/2021 | Zhao | H05K 5/0017 |
| 2012/0075782 A1 | 3/2012 | Wu et al. | |
| 2014/0320436 A1 | 10/2014 | Modarres et al. | |
| 2015/0220117 A1* | 8/2015 | Lee | G06F 1/1652 361/749 |
| 2016/0224066 A1 | 8/2016 | Hussa | |
| 2016/0323966 A1 | 11/2016 | Hamel | |
| 2018/0224941 A1* | 8/2018 | Modarres | G06F 3/016 |
| 2018/0364764 A1* | 12/2018 | Lin | G06F 1/1656 |
| 2019/0166696 A1* | 5/2019 | Lin | H05K 1/189 |

FOREIGN PATENT DOCUMENTS

| | | |
|---|---|---|
| CN | 104658430 A | 5/2015 |
| CN | 104820511 A | 8/2015 |
| CN | 105144052 A | 12/2015 |
| CN | 105652975 A | 6/2016 |
| CN | 106125846 A | 11/2016 |
| CN | 106205396 A | 12/2016 |
| CN | 206412029 U | 8/2017 |
| CN | 107209536 A | 9/2017 |
| CN | 104751739 B | 6/2018 |

OTHER PUBLICATIONS

Decision of Rejection in the Chinese Patent Application No. 201710899875.3, dated Jan. 26, 2021; English translation attached.

South China Normal University et al., "Chemical Engineering Fundamental Concise Course", p. 12-13; English translation attached.

First Office Action in the Chinese Patent Application No. 201710899875.3, dated Mar. 2, 2020; English translation attached.

* cited by examiner

FIG. 8 forming a foldable display panel comprising a bendable portion in the display area

↓ forming a first chamber and a second chamber in the display area and connected with each other, the first chamber formed so that an orthographic projection of the first chamber on the foldable display panel at least partially covers the bendable portion

↓ providing a variable stiffness material in one or a combination of the first chamber and the second chamber; wherein the variable stiffness material is in at least the first chamber thereby providing support for the bendable portion of the foldable display panel in an unfolded configuration, and is at least partially transferred to the second chamber thereby reducing stress in the bendable portion in the foldable display panel in a folded configuration

FIG. 9

FOLDABLE DISPLAY APPARATUS, ELECTRONIC APPARATUS, METHOD OF OPERATING FOLDABLE DISPLAY APPARATUS, AND METHOD OF FABRICATING FOLDABLE DISPLAY APPARATUS

CROSS-REFERENCE TO RELATED APPLICATION

This application is a national stage application under 35 U.S.C. § 371 of International Application No. PCT/CN2018/108317, filed Sep. 28, 2018, which claims priority to Chinese Patent Application No. 201710899875.3, filed Sep. 28, 2017, the contents of which are incorporated by reference in the entirety.

TECHNICAL FIELD

The present invention relates to display technology, more particularly, to a foldable display apparatus, an electronic apparatus, a method of operating a foldable display apparatus, and a method of fabricating a foldable display apparatus.

BACKGROUND

A flexible display apparatus is a bendable or deformable display apparatus having a flexible display panel. Examples of flexible display apparatuses include a flexible organic light emitting diode (OLED) display apparatus, a flexible electrophoretic display (EPD) apparatus, and a flexible liquid crystal display (LCD) apparatus. As a new generation display apparatus, the flexible display apparatus is thinner and lighter, having high contrast, high responsiveness, and high brightness. It also provides full color and a wide viewing angle. The flexible display apparatus has found a wide range of applications in mobiles phones, personal digital assistance (PDAs), digital cameras, on-board displays, notebook computers, on-wall televisions, as well as various military applications. A flexible display apparatus includes a flexible army substrate. A base substrate of the flexible array substrate can be made of flexible material such as plastic.

SUMMARY

In one aspect, the present invention provides a foldable display apparatus having a display area for image display, comprising a foldable display panel comprising a bendable portion in the display area; a first chamber and a second chamber in the display area and connected with each other, an orthographic projection of the first chamber on the foldable display panel at least partially covers the bendable portion; and a variable stiffness material in at least the first chamber thereby providing support for the bendable portion of the foldable display panel in an unfolded configuration, and being at least partially transferred to the second chamber thereby reducing stress in the bondable portion in the foldable display panel in a folded configuration.

Optionally, the first chamber and the second chamber are in contact with a same layer of the foldable display panel in the display area.

Optionally, the first chamber and the second chamber are in a same layer and have a substantially same thickness.

Optionally, the foldable display apparatus further comprises a support in the display area for supporting a non-bendable portion of the foldable display panel; wherein the support, the first chamber, and the second chamber are in contact with a same layer of the foldable display panel in the display area.

Optionally, the support, the first chamber, and the second chamber are in a same layer and have a substantially same thickness.

Optionally, the variable stiffness material is in a solid state and fills in the first chamber when the foldable display panel is in an unfolded configuration; and when the foldable display panel transitions from the unfolded configuration to a folded configuration, the variable stiffness material transitions from the solid state to a liquid state and at least partially withdraws from the first chamber thereby creating an unfilled space in the first chamber, the variable stiffness material being absent in the unfilled space, and the unfilled space being on a side of the first chamber facing the foldable display panel.

Optionally, the first chamber comprises a first housing for receiving the variable stiffness material, the first housing comprising a first flexible portion in contact with the bendable portion of the foldable display panel.

Optionally, the second chamber comprises a second housing for receiving the variable stiffness material, the second housing comprising a rigid portion in contact with the foldable display panel.

Optionally, the second chamber comprises a second housing for receiving the variable stiffness material, the second housing comprising a second flexible portion in contact with the foldable display panel.

Optionally, the foldable display apparatus further comprises a micro pump directly connected to one of the first chamber and the second chamber; and a channel connecting the first chamber and the second chamber, wherein the channel is on a side of the micro pump distal to the foldable display panel.

Optionally, the foldable display apparatus further comprises a micro pump; wherein the first chamber and the second chamber are connected with each other through the micro pump.

Optionally, the variable stiffness material comprises an electro rheological fluid; and the first chamber comprises electrodes on two lateral sides of the first chamber opposite to each other.

Optionally, the second chamber comprises electrodes on two lateral sides of the second chamber opposite to each other.

Optionally, the variable stiffness material comprises solid particles dispersed in an insulating liquid medium; each of the solid particles comprises an inner core and an outer shell coated on at least a portion of an outer surface of the inner core; the inner core comprises barium titanium oxide nanoparticles; and the outer shell comprises urea doped with rubidium.

In another aspect, the present invention provides an electronic apparatus, comprising the foldable display apparatus described herein or fabricated by a method described herein, and one or more integrated circuits connected to the foldable display apparatus.

In another aspect, the present invention provides a method of operating a foldable display apparatus having a display area for image display; wherein the foldable display apparatus comprises a foldable display panel comprising a bendable portion in the display area; a first chamber and a second chamber in the display area and connected with each other, an orthographic projection of the first chamber on the foldable display panel at least partially covers the bendable portion; and a variable stiffness material in one or a combination of the first chamber and the second chamber; the method comprises converting the foldable display apparatus from a folded configuration to an unfolded configuration, thereby unfolding the foldable display apparatus; wherein converting the foldable display apparatus from the folded configuration to the unfolded configuration comprises filling the first chamber with the variable stiffness material in a liquid state during a transition from the folded configuration to the unfolded configuration; and maintaining the variable stiffness material in a solid state when the foldable display apparatus is in the unfolded configuration, thereby providing support for the bendable portion of the foldable display panel in the unfolded configuration.

Optionally, the method further comprises converting the foldable display apparatus from the unfolded configuration to the folded configuration, thereby folding the foldable display apparatus; wherein converting the foldable display apparatus from the unfolded configuration to the folded configuration comprises converting the variable stiffness material from the solid state into the liquid state; and at least partially transferring the variable stiffness material in the liquid state from the first chamber into the second chamber during a transition from the unfolded configuration to the folded configuration, thereby reducing stress in the bendable portion in the foldable display panel in a folded configuration.

Optionally, the method further comprises, when a transition process from the unfolded configuration to the folded configuration is complete or stopped, converting the variable stiffness material from the liquid state into the solid state, thereby providing support for the foldable display panel in the folded configuration.

In another aspect, the present invention provides a method of fabricating a foldable display apparatus having a display area for image display, comprising forming a foldable display panel comprising a bondable portion in the display area; forming a first chamber and a second chamber in the display area and connected with each other, the first chamber formed so that an orthographic projection of the first chamber on the foldable display panel at least partially covers the bendable portion; and providing a variable stiffness material in one or a combination of the first chamber and the second chamber; wherein the variable stiffness material is in at least the first chamber thereby providing support for the bendable portion of the foldable display panel in an unfolded configuration, and is at least partially transferred to the second chamber thereby reducing stress in the bendable portion in the foldable display panel in a folded configuration.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Conventional foldable display panel, when folded, are prone to corrugation and wrinkling in a bondable portion, which is bent or folded during the folding process. The corrugation or wrinkling subjects the foldable display panel to damages, decreasing life time of the foldable display panel.

Accordingly, the present disclosure provides, inter alia, a foldable display apparatus, an electronic apparatus, a method of operating a foldable display apparatus, and a method of fabricating a foldable display apparatus that substantially obviate one or more of the problems due to limitations and disadvantages of the related art. In one aspect, the present disclosure provides a foldable display apparatus having a display area for image display. In some embodiments, the foldable display apparatus includes a foldable display panel including a bendable portion in the display area; a first chamber and a second chamber in the display area and connected with each other, and a variable stiffness material in at least the first chamber thereby providing support for the bendable portion of the foldable display panel in an unfolded configuration, and being at least partially transferred to the second chamber thereby reducing stress in the bendable portion in the foldable display panel in a folded configuration. Optionally, an orthographic projection of the first chamber on the foldable display panel at least partially covers the bondable portion. Optionally, the foldable display apparatus further comprises a peripheral area.

As used herein, the term "display area" refers to an area of a display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel.

Optionally, the inter-subpixel region is a region between adjacent subpixel regions in a same pixel. Optionally, the inter-subpixel region is a region between two adjacent subpixel regions from two adjacent pixels. As used herein the term "peripheral area" refers to an area of a display panel where various circuits and wires are provided to transmit signals to the display substrate. To increase the transparency of the display apparatus, non-transparent or opaque components of the display apparatus (e.g., battery, printed circuit board, metal frame), can be disposed in the peripheral area rather than in the display areas.

Figure 1:
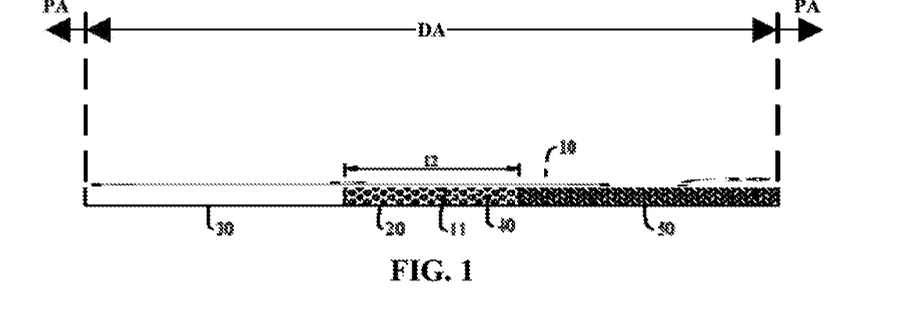
FIG. 1 is a diagram illustrating the structure of a foldable display apparatus in an unfolded configuration in some embodiments according to the present disclosure.

FIG. 1 is a diagram illustrating the structure of a foldable display apparatus in an unfolded configuration in some embodiments according to the present disclosure. Referring to FIG. 1, the foldable display apparatus has a display area DA for image display. Optionally, the foldable display apparatus also a peripheral area PA. The foldable display apparatus in some embodiments includes a foldable display panel 10. The foldable display panel 10 includes a bendable portion 12 in the display area DA. Optionally, the foldable display panel 10 further includes one or more non-bendable portions. As shown in FIG. 1, the foldable display apparatus in some embodiments further includes a first chamber 20 and a second chamber 30 at least partially in the display area DA and connected with each other. An orthographic projection of the first chamber 20 on the foldable display panel 10 at least partially covers the bendable portion 12.

Figure 2:
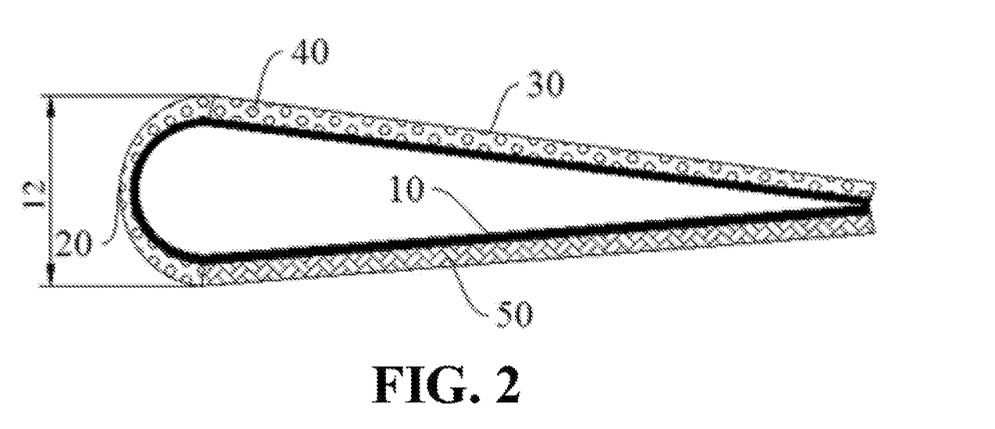
FIG. 2 is a diagram illustrating the structure of a foldable display apparatus in a folded configuration in some embodiments according to the present disclosure.

Referring to FIG. 1, the foldable display apparatus in some embodiments further includes a variable stiffness material 40 in at least the first chamber 20 thereby providing support for the bendable portion of the foldable display panel 10 in an unfolded configuration. FIG. 2 is a diagram illustrating the structure of a foldable display apparatus in a folded configuration in some embodiments according to the present disclosure. Referring to FIG. 2, the variable stiffness material 40 is at least partially transferred to the second chamber 30 thereby reducing stress in the bondable portion 12 in the foldable display panel 10 in a folded configuration. As used herein, the term "variable stiffness material" refers to a material whose stiffness can be controllably varied, e.g., by electrorheological, magnetorheological, fluidic, thermal, mechanical, electromagnetic, magnetic, chemical, electrical, or other means, or by combinations of two or more of the above. Optionally, the variable stiffness material can be controlled to transition from a liquid state to a solid state, and transition from a solid state to a liquid state, e.g., by electrorheological, magnetorheological, fluidic, thermal, mechanical, electromagnetic, magnetic, chemical, electrical, or other means, or by combinations of two or more of the above. Examples of appropriate variable stiffness materials include rheological materials such as electro-rheological materials and magneto-rheological materials. Magneto-rheological fluids are generally known as disclosed in U.S. Pat. Nos. 5,257,681; 5,284,330; 5,277,281; 5,167,850; 4,992,190, the disclosures of which are incorporated by reference herein in the entirety. Electro-rheological fluids are also generally known as disclosed in U.S. Pat. Nos. 4,923,057; 5,087,382; 5,075,023; and 5,139,691, the disclosures of which are incorporated by reference herein in the entirety.

Referring to FIG. 1 and FIG. 2, in some embodiments, the first chamber 20 and the second chamber 30 are in contact with a same layer of the foldable display panel 10 in the display area. FIG. 1 illustrates a contacting surface 11 of the foldable display panel 10. As shown in FIG. 1, the first chamber 20 and the second chamber 30 in some embodiments are in contact with the contacting surface 11 of the foldable display panel 10. Optionally, the first chamber 20 and the second chamber 30 are in a same layer and have a substantially same thickness. In one example, the first chamber 20 and the second chamber 30 are disposed on a same horizontal plane (e.g., a plane containing the contacting surface 11 of the foldable display panel 10), and have a substantially same thickness. As used herein, the term "substantially the same" refers to a difference between two values not exceeding 10%, e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%. By having the first chamber 20 and the second chamber 30 in a same layer and in the display area DA, the foldable display apparatus can be made ultra-thin.

When the foldable display apparatus is in the unfolded configuration, the variable stiffness material fills in the first chamber 20 to provide support for the bendable portion 12 of the foldable display panel 10 in an unfolded configuration. When the foldable display apparatus is in the folded configuration or transitions from the unfolded configuration to the folded configuration, the variable stiffness material is at least partially transferred to the second chamber 30 thereby reducing stress in the bendable portion 12 in the foldable display panel 10 in a folded configuration. By having this structure, the corrugation or wrinkle in the bendable portion 12 caused by folding the foldable display apparatus can be avoided.

In some embodiments, when the foldable display panel 10 is in an unfolded configuration, a total volume of the variable stiffness material 40 is less than a sum of volumes of the first chamber 20 and the second chamber 30, and equal to or greater than a volume of the first chamber 20. Referring to FIG. 1, the total volume of the variable stiffness material 40 equals to the volume of the first chamber 20. The bendable portion 12 can be sufficiently supported by the variable stiffness material 40 filled in the first chamber 20 when the foldable display panel 10 is in an unfolded configuration, avoiding corrugation or wrinkling in the bendable portion 12.

Figure 3:
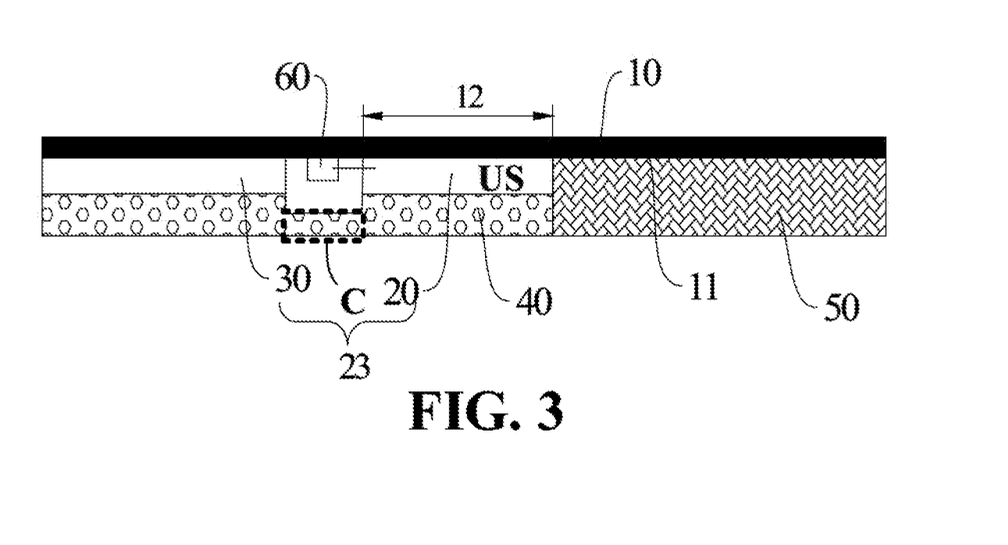
FIG. 3 is a diagram illustrating the structure of a foldable display apparatus transitioning from an unfolded configuration to a folded configuration in some embodiments according to the present disclosure.

In some embodiments, referring to FIG. 1, the variable stiffness material 40 is in a solid state and fills in the first chamber 20 when the foldable display panel 10 is in an unfolded configuration. FIG. 3 is a diagram illustrating the structure of a foldable display apparatus transitioning from an unfolded configuration to a folded configuration in some embodiments according to the present disclosure. Referring to FIG. 3, when the foldable display panel 10 transitions from the unfolded configuration to a folded configuration (e.g., at the starting moment of the transition), the variable stiffness material 40 transitions from the solid state to a liquid state and at least partially withdraws from the first chamber 20 thereby creating an unfilled space US in the first chamber 20. The variable stiffness material 40 is absent in the unfilled space US. Subsequently, the foldable display panel 10 begins to fold, the unfilled space US provides the space needed for receiving the bendable portion 12, thereby reducing stress in the bondable portion 12 in the foldable display panel 10 in a folded configuration. In one example, when the foldable display panel 10 is folded, the bendable portion 12 smoothly bends into the unfilled space US, corrugation and wrinkling in the bendable portion 12 can be avoided.

Optionally, the unfilled space US is on a side of the first chamber 20 facing the foldable display panel 10. In one example, the unfilled space US is between the contacting surface 11 of the foldable display panel 10 and the variable stiffness material 40 remaining in the first chamber 20. Optionally, the contacting surface 11 of the foldable display panel 10 is a surface of the foldable display panel 10 opposite to a light emitting surface of the foldable display panel 10.

Optionally, when the foldable display apparatus is in the folded configuration, or transitioning from the unfolded configuration to the folded configuration, the variable stiffness material 40 is completely transferred from the first chamber 20 into the second chamber 30. Optionally, when the foldable display apparatus is in the folded configuration, or transitioning from the unfolded configuration to the folded configuration, the variable stiffness material 40 is partially transferred from the first chamber 20 into the second chamber 30. For example, a part of the variable stiffness material 40 remains in the first chamber 20 when the foldable display apparatus is in the folded configuration, or transitioning from the unfolded configuration to the folded configuration, as long as the unfilled space US provides a space sufficient for receiving the bendable portion 12.

Figure 4:
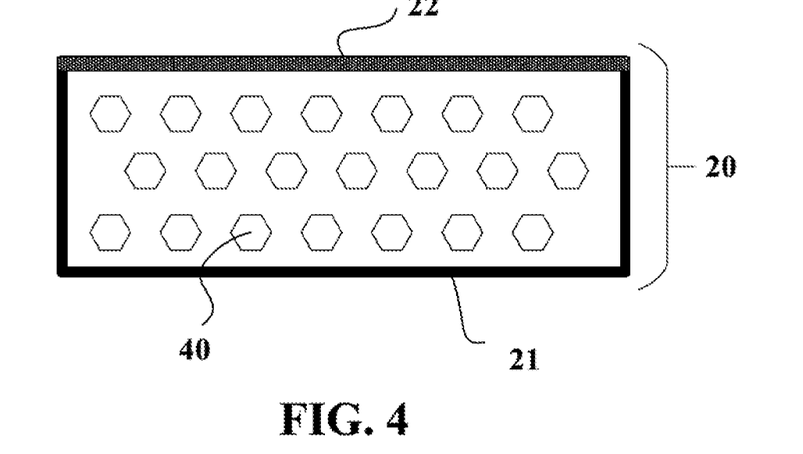
FIG. 4 is a diagram illustrating the structure of a first chamber in some embodiments according to the present disclosure.

FIG. 4 is a diagram illustrating the structure of a first chamber in some embodiments according to the present disclosure. Referring to FIG. 4, in some embodiments, the first chamber 20 includes a first housing 21 for receiving the variable stiffness material 40, the first housing 21 includes a first flexible portion 22 in contact with the bendable portion 12 of the foldable display panel 10. By having the bendable portion 12 in contact with the first flexible portion 22, stress induced upon the bondable portion 12 of the foldable display panel 10 during the folding or bending process can be readily dissipated, avoiding damages to the bendable portion 12.

Figure 5:
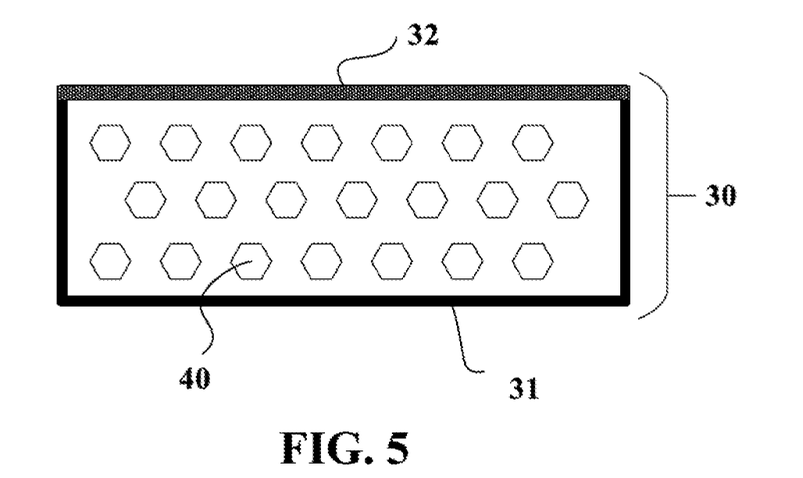
FIG. 5 is a diagram illustrating the structure of a second chamber in some embodiments according to the present disclosure.

FIG. 5 is a diagram illustrating the structure of a second chamber in some embodiments according to the present disclosure. Referring to FIG. 5, in some embodiments, the second chamber 30 includes a second housing 31 for receiving the variable stiffness material 40, and a portion 32 in contact with the foldable display panel 10. Optionally, the portion 32 is a rigid portion in contact with a non-bendable portion of the foldable display panel 10. Optionally, the rigid portion includes one or a combination of a metal, an alloy, and a rigid polymer material. The rigid portion provides support for the non-bendable portion of the foldable display panel 10.

Optionally, the portion 32 is a second flexible portion in contact with the foldable display panel 10. Optionally, the portion of the foldable display panel 10 in contact with the second flexible portion is also a flexible portion. Optionally, the portion of the foldable display panel 10 in contact with the second flexible portion is a rigid portion. Optionally, a total volume of the variable stiffness material 40 is less than a sum of volumes of the first chamber 20 and the second chamber 30, and equal to or greater than a volume of the first chamber 20. Optionally, when the foldable display apparatus is in the unfolded configuration, at least some of the variable stiffness material 40 remains in the second chamber 30, providing support for the foldable display panel 10. This design allows an unfilled space to be provided when the foldable display apparatus transitioning into a folded configuration.

In some embodiments, the first chamber 20 and the second chamber 30 are in fluid communication with each other through an actuator. Referring to FIG. 3, the foldable display apparatus in some embodiments further includes a first micro pump 60 connected to one of the first chamber 20 and the second chamber 30. In FIG. 3, the first micro pump 60 is connected to the first chamber 20. Optionally, the foldable display apparatus in some embodiments further includes a channel C connecting the first chamber 20 and the second chamber 30. Optionally, the first chamber 20, the second chamber 30, and the channel C constitute a U-shaped chamber. Optionally, as shown in IG. 3, the channel C is spaced apart from the foldable display panel 10, e.g., not in contact with a surface of the foldable display panel 10. Optionally, the channel C is on a side of the first micro pump 60 distal to the foldable display panel 10. Optionally, the first micro pump 60 is directly connected to only one of the first chamber 20 and the second chamber 30, and indirectly connected to the other one of the first chamber 20 and the second chamber 30. In one example, as shown in FIG. 3, the first micro pump 60 is directly connected to the first chamber 20, but directly connected to the second chamber 30. Optionally, the first micro pump 60 is directly connected to the first chamber 20 on a lateral side of the first chamber 20. Optionally, the first micro pump 60 is directly connected to the second chamber 30 on a lateral side of the second chamber 30.

When the foldable display panel 10 is in an unfolded configuration, the variable stiffness material 40 is in a solid state and fills in the first chamber 20, providing support for the bendable portion 12 of the foldable display panel 10. When the foldable display panel 10 transitions from the unfolded configuration to a folded configuration, the variable stiffness material 40 transitions from the solid state to a liquid state, the first micro pump 60 pumps a gas into the first chamber 20 to increase atmosphere pressure therein, thereby driving the variable stiffness material 40 in the first chamber 20 toward the second chamber 30. The variable stiffness material 40 at least partially withdraws from the first chamber 20 thereby creating an unfilled space US in the first chamber 20. Optionally, the unfilled space US is on a side of the first chamber 20 facing the foldable display panel 10, creating a space for smoothly receiving the bendable portion 12 of the foldable display panel 10 when the foldable display panel 10 is bent. Corrugation or wrinkling in the bendable portion 12 can be effectively prevented. Optionally, when the variable stiffness material 40 is transferred into the second chamber 30, it transitions from the liquid state into a solid state, providing support for the foldable display panel 10 in a region corresponding to the second chamber 30. Optionally, when the transition process from the unfolded configuration to the folded configuration is complete or stopped, the variable stiffness material 40 in both the first chamber 20 and the second chamber 30 transitions into the solid state, thereby providing support for the foldable display panel 10 in the folded configuration.

When the foldable display panel 10 transitions from the folded configuration back to the unfolded configuration, the variable stiffness material 40 again transitions from the solid state to the liquid state, the first micro pump 60 withdraws a gas out of the first chamber 20 to decrease the atmosphere pressure therein. The variable stiffness material 40 is driven from the second chamber 30 into the first chamber 20. Optionally, when the variable stiffness material 40 is transferred into the first chamber 20, it transitions from the liquid state into a solid state, providing support for the foldable display panel 10 in a region corresponding to the first chamber 20.

Figure 6:
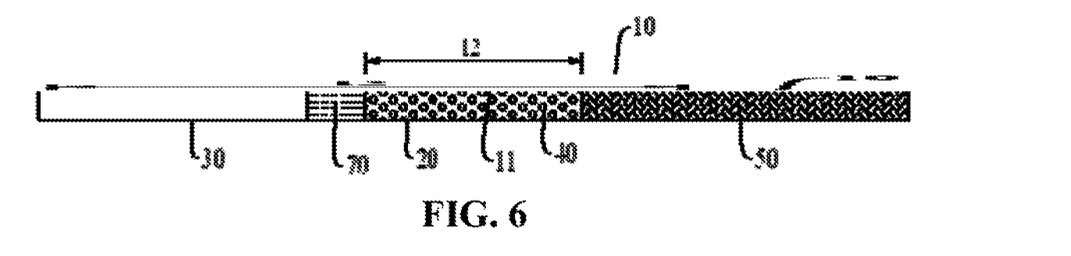
FIG. 6 is a diagram illustrating the structure of a foldable display apparatus in some embodiments according to the present disclosure.

FIG. 6 is a diagram illustrating the structure of a foldable display apparatus in some embodiments according to the present disclosure. Referring to FIG. 6, the foldable display apparatus in some embodiments further includes a second micro pump 70. The first chamber 20 and the second chamber 30 are connected with each other through the second micro pump 70. The first chamber 20 and the second chamber 30 are capable of being in fluid communication with each other when the variable stiffness material is in a liquid state. When the foldable display panel 10 is in an unfolded configuration, the variable stiffness material 40 is in a solid state and fills in the first chamber 20, providing support for the bondable portion 12 of the foldable display panel 10. When the foldable display panel 10 transitions from the unfolded configuration to a folded configuration, the variable stiffness material 40 transitions from the solid state to a liquid state, the second micro pump 70 pumps the variable stiffness material 40 from the first chamber 20 into the second chamber 30. The variable stiffness material 40 at least partially withdraws from the first chamber 20 thereby creating an unfilled space in the first chamber 20. Optionally, the unfilled space is on a side of the first chamber 20 facing the foldable display panel 10, creating a space for smoothly receiving the bendable portion 12 of the foldable display panel 10 when the foldable display panel 10 is bent. Corrugation or wrinkling in the bendable portion 12 can be effectively prevented. Optionally, when the variable stiffness material 40 is transferred into the second chamber 30, it transitions from the liquid state into a solid state, providing support for the foldable display panel 10 in a region corresponding to the second chamber 30. Optionally, when the transition process from the unfolded configuration to the folded configuration is complete or stopped, the variable stiffness material 40 in both the first chamber 20 and the second chamber 30 transitions into the solid state, thereby providing support for the foldable display panel 10 in the folded configuration.

Optionally, the second micro pump 70 is disposed at a position between the first chamber 20 and the second chamber 30. Optionally, the second micro pump 70 is disposed at a position on a side of the first chamber 20 distal to the second chamber 30. Optionally, the second micro pump 70 is disposed at a position on a side of the second chamber 30 distal to the first chamber 20.

Optionally, the foldable display panel 10 includes multiple ones of the bendable portion 12. The multiple ones of the bendable portion 12 disposed at a plurality of positions of the foldable display apparatus.

In some embodiments, the variable stiffness material includes a rheological fluid, e.g., an electro rheological fluid. In some embodiments, when a voltage higher than a threshold voltage is applied to the electro rheological fluid, it transitions from a liquid state into a solid state; when a voltage lower than or equal to the threshold voltage is applied to the electro rheological fluid, it transitions from the solid state back to the liquid state. In some embodiments, the variable stiffness material includes solid particles dispersed in an insulating liquid medium. Optionally, the insulating liquid medium is an insulating oil, e.g., an insulating oil having a high stability and a high boiling point, and being highly errosion-resistant. Examples of the insulating oil include silicone oil, edible oil, and mineral oil, and any combination thereof. Optionally, the solid particles include an inorganic material such as silica gel, aluminosilicate, composite metal oxide, composite metal hydroxide, a polymer material (such as a polymer semiconductor particle), a composite electrorheological fluid material (which may be a composite of different inorganic materials, a composite of different polymer materials, a composite of an inorganic material and a polymer material) and any combination thereof.

In some embodiments, each of the solid particles includes an inner core and an outer shell coated on at least a portion of an outer surface of the inner core. Optionally, the inner core includes barium titanium oxide nanoparticles. Optionally, the outer shell includes urea doped with rubidium.

Figure 7:
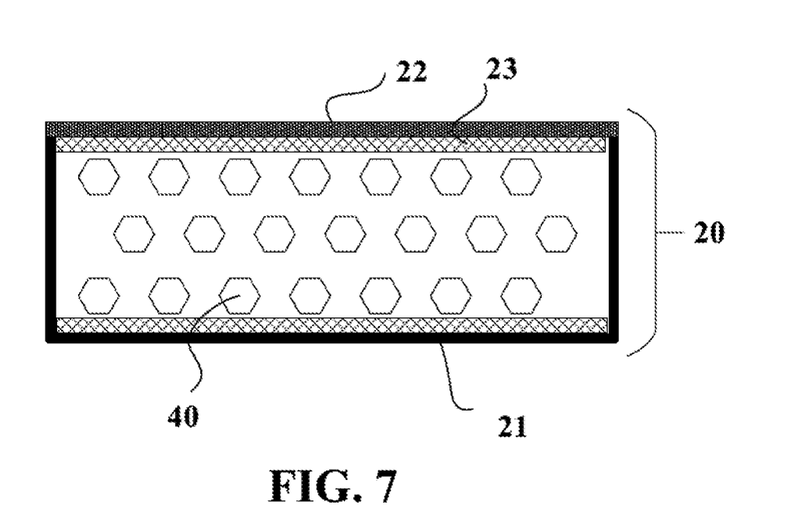
FIG. 7 is a diagram illustrating the structure of a first chamber in some embodiments according to the present disclosure.

In some embodiments, the first chamber 20 includes electrodes on two lateral sides of the first chamber 20 opposite to each other. FIG. 7 is a diagram illustrating the structure of a first chamber in some embodiments according to the present disclosure. Referring to FIG. 7, the first chamber 20 in some embodiments further includes electrodes 23 on two lateral sides of the first chamber 20 opposite to each other. By applying an electrical potential to the electro rheological fluid in the first chamber 20, the electro rheological fluid can transition between the solid state and the liquid state. Referring to FIG. 6 and FIG. 7, optionally the electrodes 23 are disposed on two lateral sides of the first chamber 20, each of the two lateral sides of the first chamber 20 substantially parallel to the contacting surface 11 of the foldable display panel 10. By having this design, the influence of fluid communication between the first chamber 20 and the second chamber 30 on the electrodes 23 can be minimized. Optionally, the electrodes 23 are conductive films.

Figure 8:
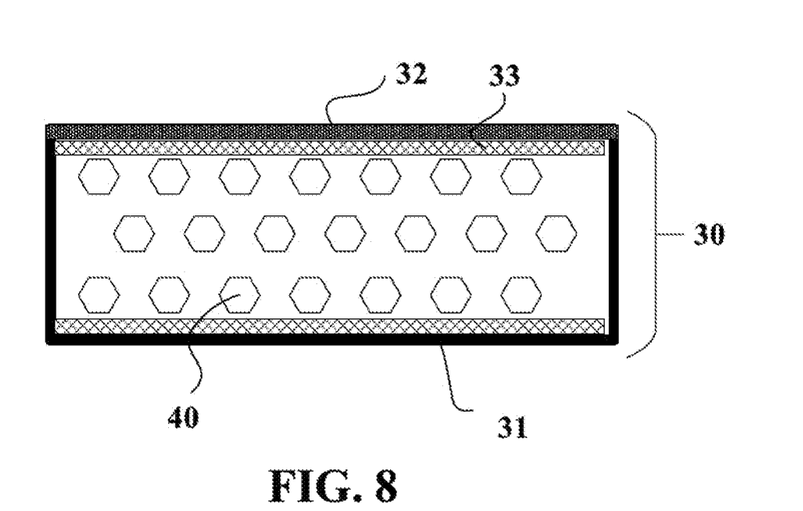
FIG. 8 is a diagram illustrating the structure of a second chamber in some embodiments according to the present disclosure.

In some embodiments, the second chamber 30 includes electrodes on two lateral sides of the second chamber 30 opposite to each other. FIG. 8 is a diagram illustrating the structure of a second chamber in some embodiments according to the present disclosure. Referring to FIG. 8, the second chamber 30 in some embodiments further includes electrodes on two lateral sides of the second chamber 30 opposite to each other. By applying an electrical potential to the electro rheological fluid in the second chamber 30, the electro rheological fluid can transition between the solid state and the liquid state. Referring to FIG. 6 and FIG. 8, optionally the electrodes 33 are disposed on two lateral sides of the second chamber 30, each of the two lateral sides of the second chamber 30 substantially parallel to the contacting surface 11 of the foldable display panel 10. By having this design, the influence of fluid communication between the first chamber 20 and the second chamber 30 on the electrodes 33 can be minimize Optionally, the electrodes 33 are conductive films.

In some embodiments, the first chamber 20 is sandwiched between the second chamber 30.

In some embodiments, the foldable display apparatus further includes a support in the display area DA for supporting a non-bendable portion of the foldable display panel 10. Referring to FIGS. 1, 2, 3, and 6, the foldable display apparatus in some embodiments further includes a support 50 in the display area DA. Various appropriate materials may be used for making the support 50. Examples of appropriate materials for making the support 50 include a metal, an alloy, a rigid polymer material, and any combination thereof. Optionally, the support 50 includes various integrated circuits, battery, and other peripheral components, minimizing the thickness of the foldable display apparatus.

Optionally, referring to FIGS. 1, 2, 3, and 6, the support 50, the first chamber 20, and the second chamber 30 are in contact with a same layer of the foldable display panel 10 in the display area DA. In one example, the support 50, the first chamber 20, and the second chamber 30 are in contact with the contacting surface 11 of the foldable display panel 10 in the display area DA. Optionally, the first chamber 20, and the second chamber 30 are in a same layer and have a substantially same thickness.

Figure 9:
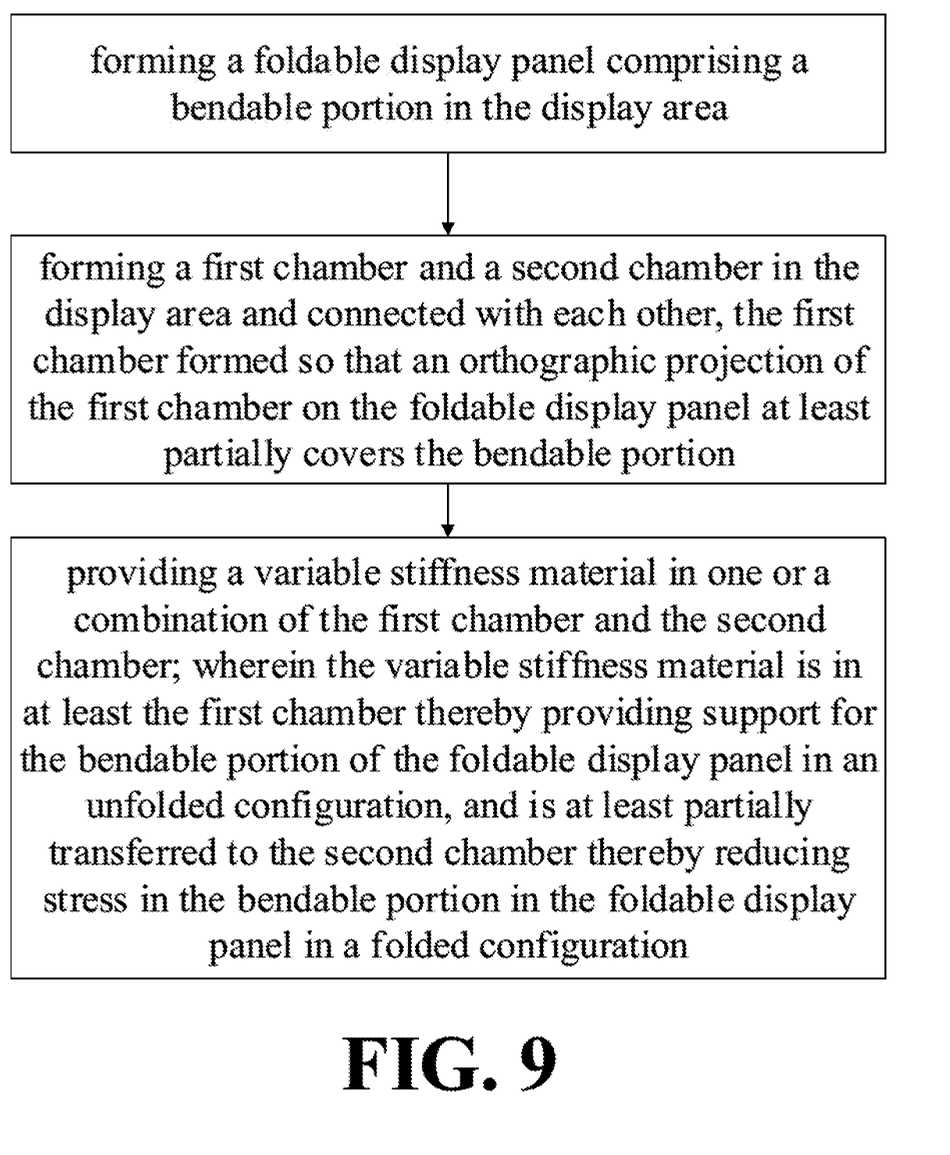
FIG. 9 is a flow chart illustrating a process of fabricating a foldable display apparatus in some embodiments according to the present disclosure.

In another aspect, the present disclosure provides a method of fabricating a foldable display apparatus. FIG. 9 is a flow chart illustrating a process of fabricating a foldable display apparatus in some embodiments according to the present disclosure. Referring to FIG. 9, the method in some embodiments includes forming a foldable display panel including a bendable portion in the display area; forming a first chamber and a second chamber in the display area and connected with each other, the first chamber formed so that an orthographic projection of the first chamber on the foldable display panel at least partially covers the bendable portion; and providing a variable stiffness material in one or a combination of the first chamber and the second chamber. Optionally, the variable stiffness material is in at least the first chamber thereby providing support for the bendable portion of the foldable display panel in an unfolded configuration, and is at least partially transferred to the second chamber thereby reducing stress in the bendable portion in the foldable display panel in a folded configuration.

Optionally, the first chamber and the second chamber are formed to be in contact with a same layer of the foldable display panel in the display area. Optionally, the first chamber and the second chamber are formed in a same layer and have a substantially same thickness.

In some embodiments, the method further includes forming a support in the display area for supporting a non-bendable portion of the foldable display panel. Optionally, the support, the first chamber, and the second chamber are formed to be in contact with a same layer of the foldable display panel in the display area. Optionally, the support, the first chamber, and the second chamber are in a same layer and have a substantially same thickness.

Optionally, the first chamber and the second chamber are formed so that a total volume of the variable stiffness material is less than a sum of volumes of the first chamber and the second chamber, and equal to or greater than a volume of the first chamber, when the foldable display panel is in an unfolded configuration.

Optionally, the variable stiffness material is formed in a solid state and fills in the first chamber when the foldable display panel is in an unfolded configuration. Optionally, when the foldable display panel transitions from the unfolded configuration to a folded configuration, the variable stiffness material is formed to transition from the solid state to a liquid state and at least partially withdraws from the first chamber thereby creating an unfilled space in the first chamber, the variable stiffness material being absent in the unfilled space, and the unfilled space being on a side of the first chamber facing the foldable display panel.

In some embodiments, the step of forming the first chamber includes forming a first housing for receiving the variable stiffness material. Optionally, the first housing is formed to include a first flexible portion in contact with the bendable portion of the foldable display panel.

In some embodiments, the step of forming the second chamber includes forming a second housing for receiving the variable stiffness material. Optionally, the second housing is formed to include a rigid portion in contact with the foldable display panel.

In some embodiments, the step of forming the second chamber includes forming a second housing for receiving the variable stiffness material. Optionally, the second housing is formed to include a second flexible portion in contact with the foldable display panel. Optionally, a total volume of the variable stiffness material is less than a sum of volumes of the first chamber and the second chamber, and equal to or greater than a volume of the first chamber.

In some embodiments, the method further includes forming a micro pump connected to one of the first chamber and the second chamber; and forming a channel connecting sides of the first chamber and the second chamber facing away the foldable display panel. Optionally, the micro pump is formed to be connected to a side of the one of the first chamber and the second chamber facing the foldable display panel.

In some embodiments, the method further includes forming a micro pump, the first chamber and the second chamber are connected with each other through the micro pump. Optionally, the first chamber and the second chamber are in fluid communication with each other through the micro pump when the variable stiffness material is in a liquid state.

In some embodiments, the step of forming the first chamber further includes forming electrodes on two lateral sides of the first chamber opposite to each other. Optionally, the variable stiffness material includes an electro rheological fluid.

In some embodiments, the step of forming the second chamber further includes forming electrodes on two lateral sides of the second chamber opposite to each other.

In another aspect, the present disclosure provides an electronic apparatus. In some embodiments, the electronic apparatus includes a foldable display apparatus described herein or fabricated by a method described herein. Optionally, the electronic apparatus further includes one or more integrated circuits connected to the foldable display apparatus. Examples of appropriate electronic apparatuses include, but are not limited to, an electronic paper, a mobile phone, a tablet computer, a television, a monitor, a notebook computer, a digital album, a GPS, etc. Optionally, the electronic apparatus further includes one or more of a touch screen, a case, a central processing unit, a camera, a fingerprint sensor, a voice processing unit, and so on.

In another aspect, the present disclosure provides a method of operating a foldable display apparatus having a display area for image display. In some embodiments, the method includes converting the foldable display apparatus from a folded configuration to an unfolded configuration, thereby unfolding the foldable display apparatus. Optionally, the step of converting the foldable display apparatus from the folded configuration to the unfolded configuration includes filling the first chamber with the variable stiffness material in a liquid state during a transition from the folded configuration to the unfolded configuration; and maintaining the variable stiffness material in a solid state when the foldable display apparatus is in the unfolded configuration, thereby providing support for the bendable portion of the foldable display panel in the unfolded configuration.

In some embodiments, the method further includes converting the foldable display apparatus from the unfolded configuration to the folded configuration, thereby folding the foldable display apparatus. Optionally, the step of converting the foldable display apparatus from the unfolded configuration to the folded configuration includes converting the variable stiffness material from the solid state into the liquid state; and at least partially transferring the variable stiffness material in the liquid state from the first chamber into the second chamber during a transition from the unfolded configuration to the folded configuration, thereby reducing stress in the bendable portion in the foldable display panel in a folded configuration.

In some embodiments, the method further includes, when a transition process from the unfolded configuration to the folded configuration is complete or stopped, converting the variable stiffness material from the liquid state into the solid state, thereby providing support for the foldable display panel in the folded configuration.

In one example, and referring to FIG. 3, when the foldable display panel 10 is in an unfolded configuration, the variable stiffness material 40 is in a solid state and fills in the first chamber 20, providing support for the bendable portion 12 of the foldable display panel 10. The variable stiffness material 40 in some embodiments is an electro rheological fluid, and can be maintained in a solid state by applying a first electrical potential to the electro rheological fluid in the first chamber 20. When the foldable display panel 10 transitions from the unfolded configuration to a folded configuration, the variable stiffness material 40 transitions from the solid state to a liquid state, the first micro pump 60 pumps a gas into the first chamber 20 to increase atmosphere pressure therein, thereby driving the variable stiffness material 40 in the first chamber 20 toward the second chamber 30. The variable stiffness material 40 in some embodiments is an electro rheological fluid, and can be transitioned from the solid state to the liquid state by applying a second electrical potential to the electro rheological fluid in the first chamber 20 and the second chamber 30. The variable stiffness material 40 at least partially withdraws from the first chamber 20 thereby creating an unfilled space US in the first chamber 20. Optionally, the unfilled space US is on a side of the first chamber 20 facing the foldable display panel 10, creating a space for smoothly receiving the bendable portion 12 of the foldable display panel 10 when the foldable display panel 10 is bent. Corrugation or wrinkling in the bendable portion 12 can be effectively prevented. Optionally, when the variable stiffness material 40 is transferred into the second chamber 30, it can be transitioned from the liquid state into a solid state by applying the first electrical potential through the electrodes, thereby providing support for the foldable display panel 10 in a region corresponding to the second chamber 30. Optionally, when the transition process from the unfolded configuration to the folded configuration is complete or stopped, the variable stiffness material 40 in both the first chamber 20 and the second chamber 30 can be transitioned into the solid state by applying the first electrical potential through the electrodes, thereby providing support for the foldable display panel 10 in the folded configuration.

When the foldable display panel 10 transitions from the folded configuration back to the unfolded configuration, the variable stiffness material 40 again transitions from the solid state to the liquid state upon application of the second electrical potential on the electrodes, the first micro pump 60 withdraws a gas out of the first chamber 20 to decrease the atmosphere pressure therein. The variable stiffness material 40 is driven from the second chamber 30 into the first chamber 20. Optionally, when the variable stiffness material 40 is transferred into the first chamber 20, it transitions from the liquid state into a solid state upon application of the first electrical potential through the electrodes, thereby providing support for the foldable display panel 10 in a region corresponding to the first chamber 20.

Referring to FIG. 6, when the foldable display panel 10 is in an unfolded configuration, the variable stiffness material 40 is in a solid state upon application of the first electrical potential and fills in the first chamber 20, providing support for the bendable portion 12 of the foldable display panel 10. When the foldable display panel 10 transitions from the unfolded configuration to a folded configuration, the variable stiffness material 40 transitions from the solid state to a liquid state upon application of the second electrical potential, the second micro pump 70 pumps the variable stiffness material 40 from the first chamber 20 into the second chamber 30. The variable stiffness material 40 at least partially withdraws from the first chamber 20 thereby creating an unfilled space in the first chamber 20. Optionally, the unfilled space is on a side of the first chamber 20 facing the foldable display panel 10, creating a space for smoothly receiving the bendable portion 12 of the foldable display panel 10 when the foldable display panel 10 is bent. Corrugation or wrinkling in the bendable portion 12 can be effectively prevented. Optionally, when the variable stiffness material 40 is transferred into the second chamber 30, it transitions from the liquid state into a solid state upon application of the first electrical potential, thereby providing support for the foldable display panel 10 in a region corresponding to the second chamber 30. Optionally, when the transition process from the unfolded configuration to the folded configuration is complete or stopped, the variable stiffness material 40 in both the first chamber 20 and the second chamber 30 transitions into the solid state upon application of the first electrical potential, thereby providing support for the foldable display panel 10 in the folded configuration.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A foldable display apparatus having a display area for image display, comprising:
    a foldable display panel comprising a bendable portion in the display area;
    a first chamber and a second chamber in the display area and connected with each other, an orthographic projection of the first chamber on the foldable display panel at least partially covers the bendable portion; and a variable stiffness material in at least the first chamber thereby providing support for the bendable portion of the foldable display panel in an unfolded configuration, and being at least partially transferred to the second chamber thereby reducing stress in the bendable portion in the foldable display panel in a folded configuration;

wherein the variable stiffness material comprises an electro rheological fluid; and the first chamber comprises electrodes on two lateral sides of the first chamber opposite to each other;

wherein the variable stiffness material comprises solid particles dispersed in an insulating liquid medium;

each of the solid particles comprises an inner core and an outer shell coated on at least a portion of an outer surface of the inner core;

the inner core comprises barium titanium oxide nanoparticles; and the outer shell comprises urea doped with rubidium.

2. The foldable display apparatus of claim 1, wherein the first chamber and the second chamber are in contact with a same layer of the foldable display panel in the display area.

3. The foldable display apparatus of claim 1, wherein the first chamber and the second chamber are in a same layer and have a substantially same thickness.

4. The foldable display apparatus of claim 1, further comprising a support in the display area for supporting a non-bendable portion of the foldable display panel;

wherein the support, the first chamber, and the second chamber are in contact with a same layer of the foldable display panel in the display area.

5. The foldable display apparatus of claim 4, wherein the support, the first chamber, and the second chamber are in a same layer and have a substantially same thickness.

6. The foldable display apparatus of claim 1, wherein the variable stiffness material is in a solid state and fills in the first chamber when the foldable display panel is in an unfolded configuration; and when the foldable display panel transitions from the unfolded configuration to a folded configuration, the variable stiffness material transitions from the solid state to a liquid state and at least partially withdraws from the first chamber thereby creating an unfilled space in the first chamber, the variable stiffness material being absent in the unfilled space, and the unfilled space being on a side of the first chamber facing the foldable display panel.

7. The foldable display apparatus of claim 1, wherein the first chamber comprises a first housing for receiving the variable stiffness material, the first housing comprising a first flexible portion in contact with the bendable portion of the foldable display panel.

8. The foldable display apparatus of claim 1, wherein the second chamber comprises a second housing for receiving the variable stiffness material, the second housing comprising a rigid portion in contact with the foldable display panel.

9. The foldable display apparatus of claim 1, wherein the second chamber comprises a second housing for receiving the variable stiffness material, the second housing comprising a second flexible portion in contact with the foldable display panel.

10. The foldable display apparatus of claim 1, further comprising a micro pump directly connected to one of the first chamber and the second chamber; and a channel connecting the first chamber and the second chamber;

wherein the channel is on a side of the micro pump distal to the foldable display panel.

11. The foldable display apparatus of claim 1, further comprising a micro pump;

wherein the first chamber and the second chamber are connected with each other through the micro pump.

12. The foldable display apparatus of claim 1, wherein the second chamber comprises electrodes on two lateral sides of the second chamber opposite to each other.

13. An electronic apparatus, comprising the foldable display apparatus of claim 1, and one or more integrated circuits connected to the foldable display apparatus.

14. A method of operating a foldable display apparatus having a display area for image display;

wherein the foldable display apparatus comprises a foldable display panel comprising a bendable portion in the display area; a first chamber and a second chamber in the display area and connected with each other, an orthographic projection of the first chamber on the foldable display panel at least partially covers the bendable portion; and a variable stiffness material in one or a combination of the first chamber and the second chamber;

the method comprises converting the foldable display apparatus from a folded configuration to an unfolded configuration, thereby unfolding the foldable display apparatus;

wherein converting the foldable display apparatus from the folded configuration to the unfolded configuration comprises:

filling the first chamber with the variable stiffness material in a liquid state during a transition from the folded configuration to the unfolded configuration; and maintaining the variable stiffness material in a solid state when the foldable display apparatus is in the unfolded configuration, thereby providing support for the bendable portion of the foldable display panel in the unfolded configuration;

wherein the variable stiffness material comprises an electro rheological fluid; and the first chamber comprises electrodes on two lateral sides of the first chamber opposite to each other;

wherein the variable stiffness material comprises solid particles dispersed in an insulating liquid medium;

each of the solid particles comprises an inner core and an outer shell coated on at least a portion of an outer surface of the inner core;

the inner core comprises barium titanium oxide nanoparticles; and the outer shell comprises urea doped with rubidium.

15. The method of claim 14, further comprising:

converting the foldable display apparatus from the unfolded configuration to the folded configuration, thereby folding the foldable display apparatus;

wherein converting the foldable display apparatus from the unfolded configuration to the folded configuration comprises:

converting the variable stiffness material from the solid state into the liquid state; and at least partially transferring the variable stiffness material in the liquid state from the first chamber into the second chamber during a transition from the unfolded configuration to the folded configuration, thereby reducing stress in the bendable portion in the foldable display panel in a folded configuration.

16. The method of claim 15, further comprising, when a transition process from the unfolded configuration to the folded configuration is complete or stopped, converting the variable stiffness material from the liquid state into the solid state, thereby providing support for the foldable display panel in the folded configuration.

17. A method of fabricating a foldable display apparatus having a display area for image display, comprising:

forming a foldable display panel comprising a bendable portion in the display area;

forming a first chamber and a second chamber in the display area and connected with each other, the first chamber formed so that an orthographic projection of the first chamber on the foldable display panel at least partially covers the bendable portion; and providing a variable stiffness material in one or a combination of the first chamber and the second chamber;

wherein the variable stiffness material is in at least the first chamber thereby providing support for the bendable portion of the foldable display panel in an unfolded configuration, and is at least partially transferred to the second chamber thereby reducing stress in the bendable portion in the foldable display panel in a folded configuration;

wherein the variable stiffness material comprises an electro rheological fluid; and the first chamber comprises electrodes on two lateral sides of the first chamber opposite to each other;

wherein the variable stiffness material comprises solid particles dispersed in an insulating liquid medium;

each of the solid particles comprises an inner core and an outer shell coated on at least a portion of an outer surface of the inner core;

the inner core comprises barium titanium oxide nanoparticles; and the outer shell comprises urea doped with rubidium.

* * * * *